Oct. 18, 1966  D. N. McCARTNEY  3,279,631
TRANSFER TRAILER

Filed April 2, 1964  2 Sheets-Sheet 2

INVENTOR.
DUANE N. McCARTNEY
BY Naylor + Neal
ATTORNEYS

United States Patent Office 3,279,631
Patented Oct. 18, 1966

3,279,631
TRANSFER TRAILER
Duane N. McCartney, Pebble Beach, Calif., assignor, by mesne assignments, to American Sugar Company, New York, N.Y.
Filed Apr. 2, 1964, Ser. No. 356,879
2 Claims. (Cl. 214—84)

This invention relates to a transfer trailer and more particularly to a transfer trailer for transferring freight pallets with other air freight loading equipment.

In the copending applications of Thomas R. Herrman, Ser. No. 140,516, filed Sept. 25, 1961, now Patent No. 3,164,274, and Duane N. McCartney and Victor H. Carder, Ser. No. 286,885, filed June 3, 1963, now Patent No. 3,220,585, there is disclosed a class of equipment for loading freight pallets into aircraft. In that class of equipment, air freight is loaded onto pallets and is transferred to an aircraft by a train of low overhead trailers and a low overhead, high lift elevator. The freight pallets are moved laterally off of the trailers and onto the elevator, and then the elevator is raised to the level of the aircraft fuselage to permit the pallet to be moved laterally into the aircraft.

The transfer trailer of this invention provides a conveyor transfer station between the trailers and elevator in this class of equipment to permit the equipment to be used more effectively in certain ways. With the elevator parked beside the aircraft in alignment with the cargo hatch of the aircraft, the transfer trailer is parked beside the elevator on its opposite end from the cargo hatch. The top surface of the transfer trailer is provided with a conveying surface which permits cargo pallets to be moved onto the transfer trailer in a loading direction and moved off of the transfer trailer in an unloading direction perpendicular to the loading direction.

The transfer trailer thus changes the orientation of the pallets ninety degrees during loading so that elongated rectangular pallets may be towed longitudinally in a narrow train and may then be loaded into the aircraft with their long dimensions extending transversely across the fuselage for efficient utilization of the space in the fuselage. In this regard, it will be noted that the conveying surface of the transfer trailer may be provided on the high lift elevator itself to effect the ninety degree change in orientation on the elevator, but it is desirable for certain reasons to provide for the change in orientation on a separate trailer.

Thus, the transfer trailer parked beside the elevator provides an additional freight holding station which may speed up a cargo handling operation. The transfer trailer may be positioned accurately in alignment with the elevator so that a pallet can be transferred between the elevator and transfer trailer immediately when the elevator reaches its lower position, and the task of accurately positioning the trailers of the trailer train adjacent to the transfer trailer can be performed easily while the elevator is in transit between its upper and lower positions. Additionally, the provision of the separate transfer trailer permits the use of a conveying surface of the elevator which moves the freight pallets in only one direction, and this is a desirable feature in the elevator since it permits the elevator conveyor to be powered, and it provides better control over the movement of the heavy freight pallets as they approach the fuselage.

It is an object of this invention to provide a new and improved transfer trailer for use in transferring freight and the like prior to loading on and after unloading off aircraft.

Another object of the invention is to provide such a transfer trailer which is relatively simple in design and construction.

Another object is to provide structure of the character described capable of receiving a load on one side of the transfer trailer and delivering the load off any other side.

A further object is to provide a central transferring means and a walkway separating said transferring means for facilitating delivery of cargo on and off the transfer trailer.

Other features, objects and advantages of the present invention will be apparent from the following description of a preferred embodiment illustrated in the accompanying drawings in which.

Figure 2:
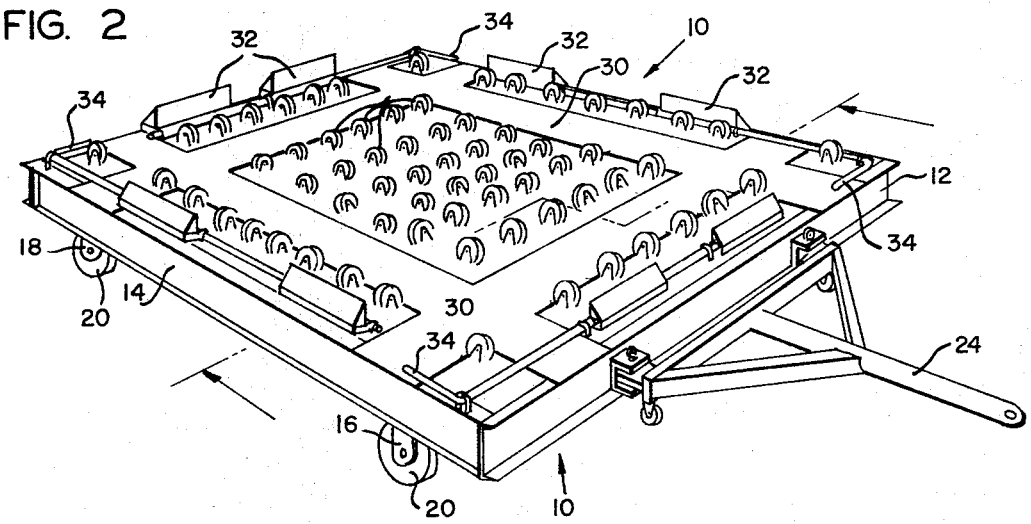
FIG. 2 is an isometric view of a transfer trailer constructed in accordance with this invention.
Figure 3:
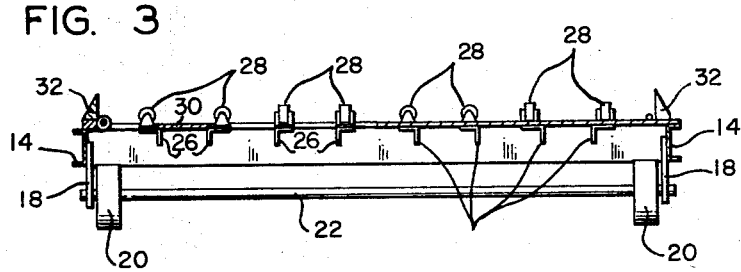
FIG. 3 is a vertical sectional view taken substantially as indicated along line 3—3 of FIG. 2.

Referring now in detail to the drawings and particularly to FIGS. 2 and 3, the transfer trailer, generally designated 10, illustrated therein includes a generally rectangular chassis having end frame members 12 and side frame members 14 which support front wheel casters 16, rear wheel brackets 18 and ground engaging wheels 20 joined by axles 22 which in turn support the chassis closely adjacent the ground. The wheels are provided with conventional locking means not shown for locking the trailer in a parked location. Trailer hitch member 24 is provided on the front end frame member 12 for permitting towing and parking of the transfer trailer, and a trailer hitch member (not shown) may be provided on the rear end of the trailer by which the trailers and a high lift trailer may be towed together in a line.

As shown in FIG. 3 a load transferring platform spans the chassis and consist of angle irons 26 which are welded to and supported on the chassis. Bolted to the angle irons 26 and forming a central transferring section and an outer transferring section are inverted casters 28. The inverted casters 28 are closely spaced together on the platform and swivel in all directions as illustrated in FIGS. 2 and 3, to permit changing the direction of motion of a pallet or load of freight on the trailer. The casters are the industrial type which are provided with grease fittings and sealed to keep out moisture and dirt. A small wheel such as a three inch diameter wheel has been found satisfactory for the casters and may be molded of a hard composition material, as, for example, blended rubber or the like.

A metal walkway 30 which separates the central transferring section and the outer transferring section is supported on angles 26 and crosses the load transferring platform both longitudinally and transversely so that an operator can walk across the trailer while pushing a loaded pallet off of the trailer. Pallet stops 32 having operating handles 34 are positioned between the peripehral or outer transferring section and the edge of the chassis for restricting the movement of any cargo. The pallet stops 32, which are disclosed in a copending application of Duane N. McCartney and Victor H. Carder, Ser. No. 286,884, filed June 3, 1963, automatically depress for loading and swing away from a pallet where manually retracted for unloading.

Figure 1:
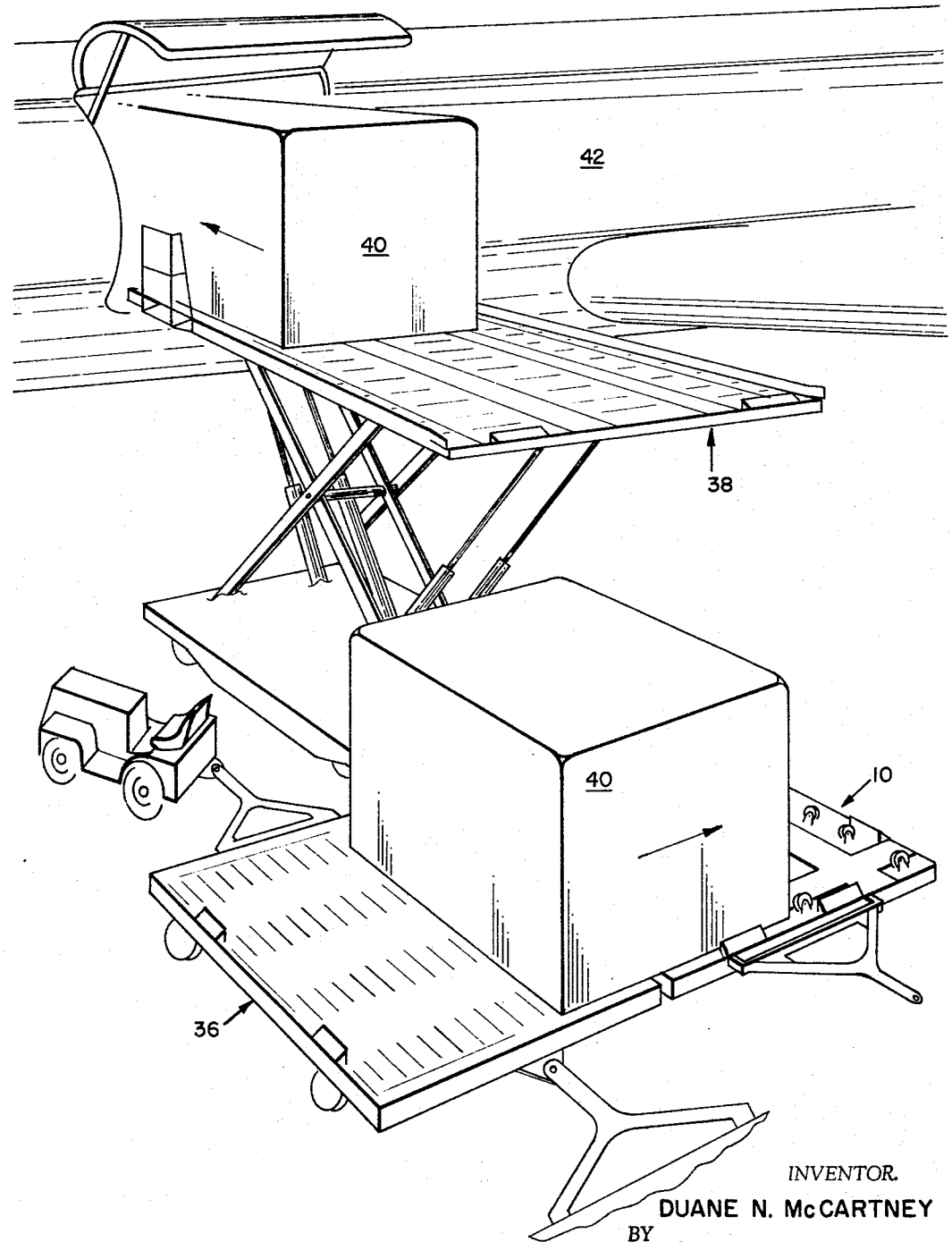
FIG. 1 is a prospective view of a transfer trailer used in conjunction with a standard pallet trailer and a low overhead high lift trailer to load freight into an aircraft.

In actual operation and as shown in FIG. 1 pallet trailers 36, the transfer trailer 10 and a low overhead high lift trailer 38 combine in the aircraft loading operation. A body of freight 40 is mounted on a thin pallet (not shown) and placed on one of a train of pallet trailers 36 for transport to the aircraft. The trailers 36 are moved sequentially to a position beside the transfer trailer 10, and the freight body 40 is moved off of the trailer 36 and onto the transfer trailer 10, as illustrated by the arrow in FIG. 1. The freight 40 is moved one direction onto the transfer trailer 10 and is then moved at right angles onto a high lift trailer 38 in its lowered position. The high lift trailer is then raised and the freight 40 moved into the aircraft 42. The reverse of the same general procedure is followed in an unloading operation.

While one specific embodiment of the invention has been illustrated and described in detail herein, it is obvious that many modifications thereof may be made without departing from the spirit and scope of the invention.

I claim:
1. A trailer for handling freight pallets comprising:
 (A) a chassis having a generally rectangular frame,
 (B) ground engaging wheels mounted on said chassis for transporting said frame closely adjacent to the ground,
 (C) a load transferring platform supported on said chassis having central transferring means and outer transferring means mounted on said platform around the periphery thereof for receiving a load of freight at any one of its four sides and discharging the load at any one of its other sides, said central transferring means and said outer transferring means comprising a plurality of inverted casters, and
 (D) a walk-way entirely separating said outer transferring means from the central transferring means for facilitating delivery of a load of freight on and off the platform.

2. The trailer of claim 1 characterized further by the inclusion of pallet stop means mounted at all of the four sides of said chassis for releasably restraining a pallet against motion off of said platform.

References Cited by the Examiner
UNITED STATES PATENTS

| | | | |
|---|---|---|---|
| 559,552 | 5/1896 | Turner | 193—35 |
| 1,660,327 | 2/1928 | Evans | 193—36 |
| 1,868,568 | 7/1932 | Yrarrazaval | 214—84 |
| 2,613,789 | 10/1952 | McLaughlin | 193—35 |
| 2,813,642 | 11/1957 | Fisher | 214—84 |
| 2,932,527 | 4/1960 | Payne | 280—43.24 |
| 3,122,245 | 2/1964 | MacKisick et al. | 214—84 |

GERALD M. FORLENZA, *Primary Examiner.*

ALBERT J. MAKAY, *Examiner.*